United States Patent [19]

Joel, Jr.

[11] 4,349,702
[45] Sep. 14, 1982

[54] NODAL SWITCHING NETWORK WITH BINARY ORDER LINKS

[75] Inventor: Amos E. Joel, Jr., South Orange, N.J.

[73] Assignee: Bell Telephone Laboratories, Incorporated, Murray Hill, N.J.

[21] Appl. No.: 905,214

[22] Filed: May 12, 1978

[51] Int. Cl.² .............................................. H04Q 3/42
[52] U.S. Cl. ............................ 179/18 GE; 179/18 EA
[58] Field of Search ....... 179/18 GE, 18 GF, 18 EA, 179/18 G

[56] References Cited

U.S. PATENT DOCUMENTS

| | | | |
|---|---|---|---|
| 3,511,937 | 5/1970 | Bastian et al. ................. | 179/18 GE |
| 4,004,103 | 1/1977 | Liu et al. ....................... | 179/18 EA |
| 4,038,638 | 7/1977 | Hwang ........................... | 179/18 GF X |

FOREIGN PATENT DOCUMENTS

2513523 10/1976 Fed. Rep. of Germany ........ 179/18 EA

*Primary Examiner*—Thomas W. Brown
*Attorney, Agent, or Firm*—H. R. Popper

[57] ABSTRACT

A nodal switching network is disclosed wherein each node is connected to distant nodes by groups of links whose lengths are ordered to span distances definable by powers of a finite (preferably binary) integer. Starting at the calling node, a single idle link in a preferred coordinate direction is attempted to be seized to extend the connection as far as possible by a direct path. If a direct path link spanning the most of the distance in the preferred coordinate direction cannot be seized, a direct path link is attempted to be seized in another coordinate direction. If no link which would extend the connection most efficiently in either coordinate direction can be seized, links of less direct length in the coordinate directions are tested. If the call is still blocked, the procedure is repeated in the direction from the called node toward the calling node.

11 Claims, 12 Drawing Figures

NODAL SWITCHING NETWORK WITH BINARY ORDER LINKS

BACKGROUND OF THE INVENTION

This invention relates to switching networks, and more particularly, to a type of communications network known as a nodal switching, iterative or cellular network. In such a network, each node provides the crosspoints and associated links to other nodes in the network to make it an equivalent and equi-connected member of the entire set of nodes defining the network. It has been said that one advantage of such a network is that it appears to permit growth to very large sizes, and that, during growth additions, fewer links should be required to be changed than in either single or two-sided multistage networks of conventional design. Further, since such a network is homogeneous, it should also be possible to make the assignments of lines, trunks, etc., terminating in the network independent of the traffic they offer or receive.

In my previous U.S. Pat. No. 3,916,124, I have disclosed a network permitting equi-interconnectability amongst a plurality of terminations and an arrangement which picks the most efficient path between the calling and called termination. In that patent, efficiency is determined by choosing a path of minimal length between the calling and called nodes. In my U.S. Pat. No. 3,906,175, I disclosed an arrangement offering higher traffic carrying capacity wherein a plurality of links are provided in each of the directions from each node to its nearest neighbor node. In my paper entitled, "Nodal Switching Networks," presented at the 7th International Teletraffic Congress at Farsta, Sweden, in April 1973, I disclosed that it might be advantageous to construct a nodal switching network where each node was not only connectable to its nearest neighbor nodes, but was also connectable by direct linkages to a certain number of more distant nodes. The particular plan there suggested was to employ links having lengths arranged according to what were there called binary skip distances. The advantage of using links to connect a node directly to more distant nodes is that the use of longer links decreases the number of links that have to be serially connected to each other to complete a connection between the calling and called nodes, thereby decreasing average link occupancy in the network. As a practical matter, the number of such direct links provided at each node in the network will be less than would be required to connect that node by a single direct link to every other node in the network. For example, each node may be provided with links of "unitary" length to its nearest neighbor nodes and with links to nodes twice, four times, eight times, etc., as distant. Such an array of links may, for convenience of terminology, be said to have links ordered according to binary skip distances. Truncating the number of binary skip distance links at some finite number less than that required directly to reach the most distant coordinate point in the network causes some increase of average link occupancy in the network. Using a mixed discipline of binary and fixed skip distance links, I postulated that networks could be designed where the number of links per node could be adjusted to attain the desired probabilities of blocking and link occupancy. However, my paper did not disclose any strategy for the efficient selection of links to be used in an interconnection. The present invention is directed to providing such a mechanism for implementing an efficient link selection strategy.

SUMMARY OF THE INVENTION

I have devised an arrangement for determining, based on the relative orientation in the nodal network of the locations of the calling and called nodes, that one of the nodes from which the attempt to extend the connection to the other should first be made and which of coordinate directions from that node should first be tested for available links. Further, based on the distance in the network between calling and called nodes, my arrangement determines the orders (=powers) of link lengths that are required to complete the connection by the most direct path. These links are sometimes hereinafter referred to as "required order" links. A preference is initially accorded to the selection of the highest order one of the required order links since such a link spans the most of the distance between the calling and called nodes. However, if a link of highest required order is not available, a link of lower required order will be selected, if available. If no link of any required order is available in the preferred coordinate direction, my arrangement will attempt to select the link of highest required order in the other of the pair of coordinate directions. If no link of any required order in the other of the coordinate directions is available, my arrangement will then attempt to seize the longest lower order link that is available in the preferred one of the coordinate directions and will then change the designation of "required orders" that are now needed to complete the connection. If no links whatever are available in the preferred one of the coordinate directions, links of lower order will be tested in the other of the coordinate directions. If still no links are available, a retrial will be initiated from the other node.

BRIEF DESCRIPTION OF THE DRAWING

The foregoing and other objects and features of my invention will become apparent from the following detailed description and drawing in which:

FIGS. 2 through 8, arranged as shown in FIG. 12, depict the mechanism for selecting the required binary link lengths to complete a connection and, more particularly;

GENERAL DESCRIPTION

Figures 1, 12:
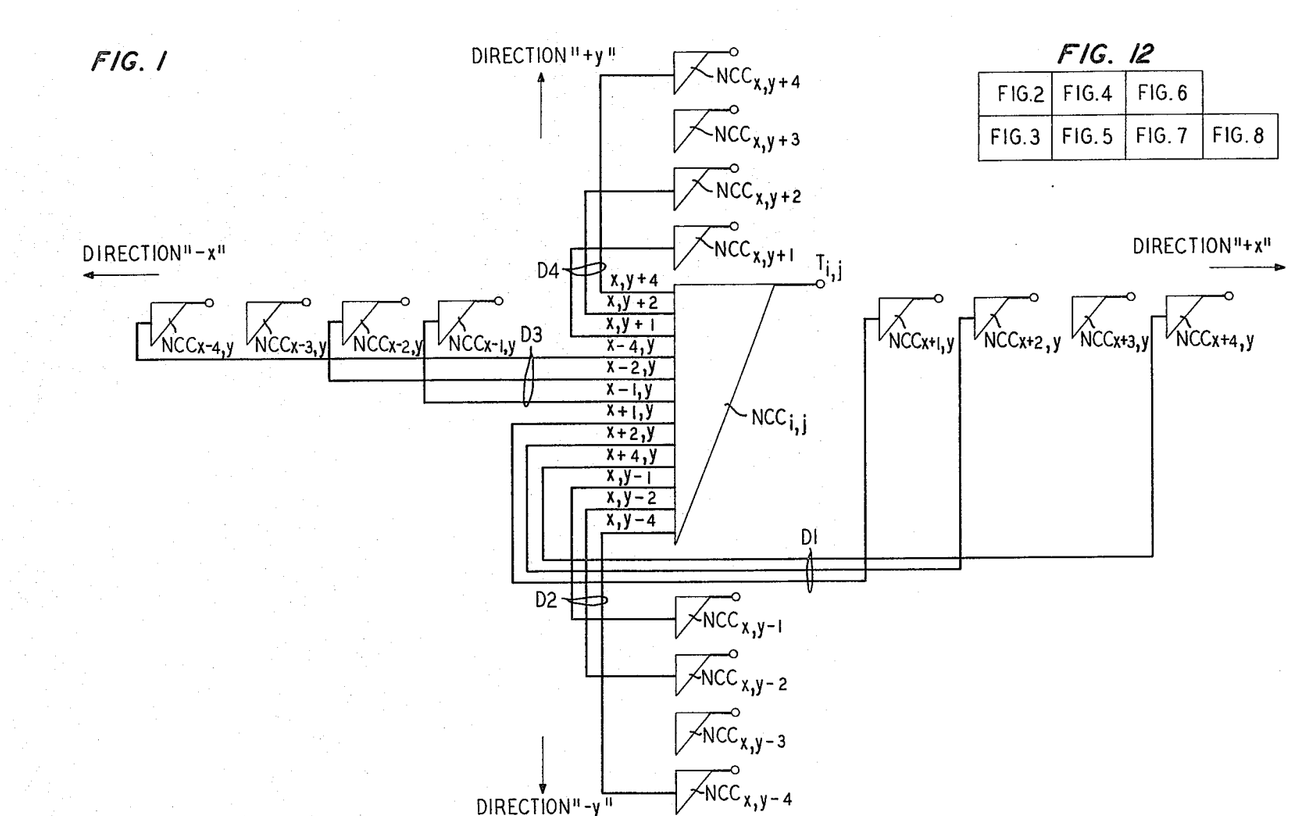
FIG. 1 shows a nodal switch having three orders of binary link lengths in each of four coordinate directions.
FIG. 12 shows how FIGS. 2 through 8 ought to be arranged.

The present invention deals with an arrangement for selecting paths to interconnect a calling and called node in a nodal switching network wherein each of the nodes is connected, not only to its immediate neighbor nodes, but also to a predetermined pattern of more distant nodes by direct links. The particular pattern chosen in the illustrative embodiment is one involving what may be termed binary skip distances. Referring to FIG. 1, an arbitrarily selected node $NCC_{i,j}$ is schematically shown in the middle of the figure. The symbolism employed is similar to that employed in FIG. 8 of the above-mentioned paper entitled, "Nodal Switching Networks."

Switching node $NCC_{i,j}$, also hereinafter sometimes referred to as a nodal network configuration, contains appropriate crosspoints and cross-point control circuitry to establish a connection from its termination $T_{i,j}$ to any of the links X,Y+4 through X,Y−4 listed along the left-hand edge of the node. In addition, there are sufficient crosspoints so that any of the links X,Y+4 through X,Y−4 entering the node in any one of the directions defined by link group cables D1 through D4 may be connected to any other link in any of the three other link group cables.

In the illustrative embodiment depicted, each link group cable contains conductors to the closest neighbor node, to the next nearest node and to the fourth closest node. In the "+Y" direction, for example, link group cable D4 contains conductors to the nearest node $NCC_{x,y+1}$, to the second nearest node $NCC_{x,y+2}$, and to the fourth nearest node $NCC_{x,y+4}$. In FIG. 1, only one lead is shown from the central node $NCC_{i,j}$ to a more distant node in any of link group cables D1 through D4, and no link group cables are shown except those linking the central node $NCC_{i,j}$ to its neighbor nodes in the binary skip distance pattern. It is to be understood, however, that each node in the nodal network may be connected to another node in the network by a number of conductors and that in the ensuing description each illustrated conductor in a link group cable may be taken as one conductor of a cable group. Conventional hunting equipment may then be employed in tandem with the hunting and path selection equipment of my invention about to be described herein. The "+X", "−Y," "−X" and "+Y" directions from any given node will also sometimes hereinafter be alluded to in terms of the directions represented by the respective link group cables D1 through D4 at the particular node.

Although, for the sake of simplifying the drawing, direct links of only the three binary orders $2^0=1$, $2^1=2$, and $2^2=4$ have been illustrated in FIG. 1, it is to be understood that, in general, the number of binary orders, n, linking each node to other nodes in one coordinate direction of the nodal network would preferably be equal to the base 2 logarithm of half the maximum number of nodes in that direction. Where the nodal network "plane" contains NM nodes and N is the "length" of the plane in the "X" direction (and M is the "breadth" of the plane in the "Y" direction), then the number of binary orders in the "X" direction is given by $$n_x = \log_2(N/2);$$

while in the "Y" direction, if $N \neq M$, $m_y = \log_2(M/2)$.

DETAILED DESCRIPTION

Figure 2:
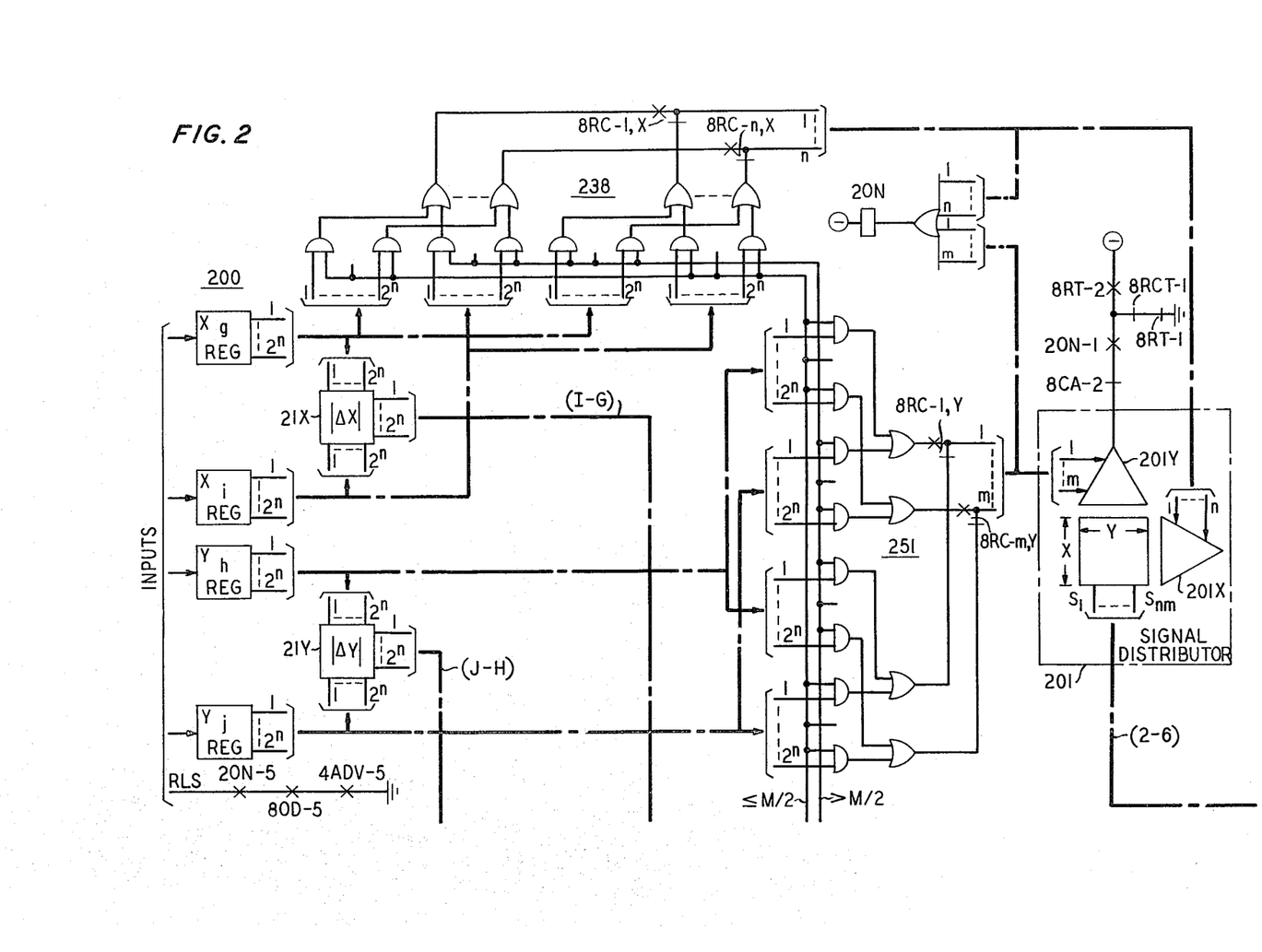
FIGS. 2 and 3 show the circuits for registering the designations of, and for indicating the distances between, calling and called nodes.
Figure 3:
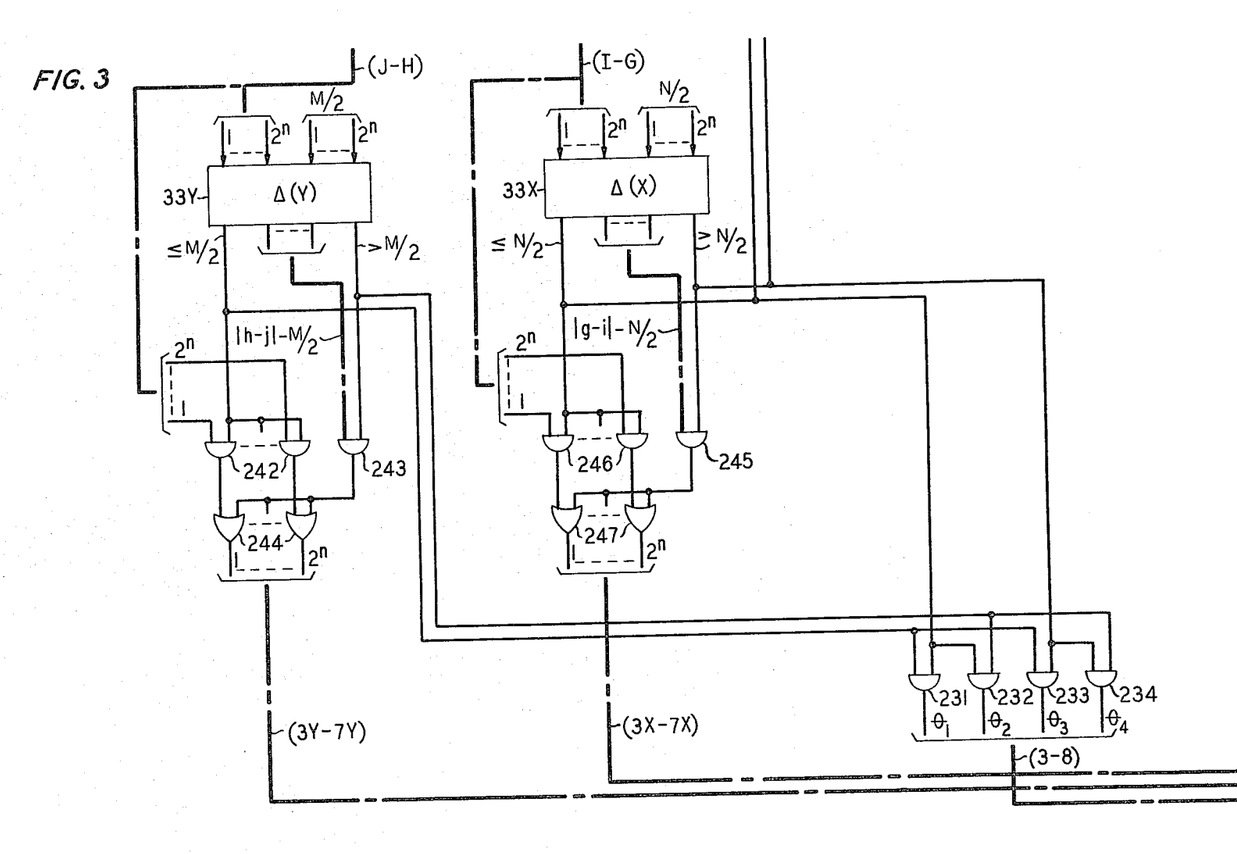

The network control process begins with the loading of the input registers $X_g$, $X_i$, $Y_h$ and $Y_j$ in the input registers 200 of FIG. 2. FIGS. 2 and 3, it may be noted, are derived from FIG. 5 of my above-mentioned U.S. Pat. No. 3,916,124 and, except for differences in numbering, the descriptions of FIGS. 2 and 3 herein parallel the description of FIG. 5 of that patent. The information that is entered into input registers 200 derives from the call information processing apparatus (not shown) of the telephone switching office in the same manner as that information was derived in the above-mentioned patent, the description of which is incorporated herein by reference.

The address of the calling node $NCC_{i,j}$ at coordinate i,j in the nodal network and that of the called node at coordinates g,h are entered into respective ones of registers 200, FIG. 2. Subtractors 21X and 21Y compute the absolute differences i−g or g−i in X-coordinates and the differences j−h or h−j, in Y-coordinates, respectively, and apply the results in binary coded form to leads $1-2^n$ of cable (I-G) and leads $1-2^n$ of cable (J-H), respectively. Cable (I-G) applies the difference between the Y-coordinates of the calling and called nodes to the left-hand input terminals of difference circuit 33X and to the left-hand input terminal of gates 246 in FIG. 3. The difference between the Y-coordinates of the calling and called nodes is applied by cable (J-H) to the left-hand inputs of difference circuit 33Y and of gates 242.

The network of the illustrative embodiment is assumed to be reentrant in both the X and Y coordinate directions and may be envisioned as being defined over a toroidal surface. In the X-coordinate direction, there are assumed to be N nodes, and in the Y direction, M nodes. Since the network is reentrant, the maximum direct path length in the X and Y directions to the most distant node cannot exceed N/2 or M/2 respectively. It should be noted that, simply for the sake of simplifying the designations of the various leads throughout the drawing, the leads of cable (J-H) have been designated $1-2^n$ rather than $1-2^m$ corresponding to the M nodes assumed to be selectable in the "Y" direction of the network. A similar approach has been taken with the various other leads associated with the "Y" direction circuits throughout the several figures of the drawing. In FIG. 2, however, the leads entering circuit 210Y and the leads emanating from circuit 201 have been designated 1 to m and $S_1$ to $S_{nm}$, respectively, as a reminder that, in general, the leads in the "Y" and "X" directions need not be identical in number.

Difference circuit 33X computes the difference between the fixed quantity N/2 and the X-coordinate differences supplied by cable (I-G) and applies the result to its output lead group $|g-i|-N/2$. Difference circuit 33Y computes the difference between the fixed quantity M/2 and the Y-coordinate differences supplied by cable (J-H) and applies the result to its output lead group $|h-j|-M/2$.

If the computed difference between $|g-i|-N/2$ is equal to or less than N/2, difference circuit 33X energizes lead $\leq N/2$ and this lead enables gates 246 to allow the binary pattern leads of cable (I–G) to be connected via OR gates 247 to cable (3X–7X). If the computed difference is greater than N/2, difference circuit 33X energizes lead $>N/2$ and this lead enables gate 245 to apply the quantity $g-i-N/2$ to cable (3X–7X). Similarly, with respect to difference circuit 33Y, the quantity $h-j-M/2$ is applied via gate 243 to cable (3Y–7Y) if output lead $>M/2$ is energized, whereas cable (3Y–7Y) receives merely the binary pattern on the leads of cable (J–H) if output lead $\leq M/2$ is energized.

The outputs of difference circuits 33X and 33Y determine which of gates 231 through 234 associated with leads $\theta_1$ through $\theta_4$ are numbered to reflect the corresponding orientations depicted in Table I. A table that indicates the selection of leads $\theta_1$ through $\theta_4$, depending on whether the difference between the X-coordinates of the calling and called nodes is greater or less than N/2, and on whether the difference between the Y-coordinates of the calling and called nodes is greater or less than M/2 is given in the following table, Table I.

TABLE I

| | (ORIENTATIONS) | |
|---|---|---|
| | g-i | h-j |
| $\theta_1$ | $<\frac{N}{2}$ | $<\frac{M}{2}$ |
| $\theta_2$ | $>\frac{N}{2}$ | $<\frac{M}{2}$ |
| $\theta_3$ | $<\frac{N}{2}$ | $>\frac{M}{2}$ |
| $\theta_4$ | $>\frac{N}{2}$ | $>\frac{M}{2}$ |

On a first trial attempt relay 8RC (FIG. 8) will be normal and the Y-coordinate address of either the calling or called node, depending on the relative orientation, is applied through gates 251 (FIG. 2) and the back contacts of transfer contacts 8RC-1,Y through 8RC-m,x to access circuit 201Y of signal distributor 201. Similarly, one of the X-coordinate addresses is applied through gates 238 and the back contacts of transfer contacts 8RC-1,X through 8RC-n,X to X-coordinate access circuit 201X of signal distributor 201. The determination of which of the coordinate addresses is applied to signal distributor 201 is made by the energization of lead $\leq N/2$ or lead $>N/2$ by difference circuit 33X (FIG. 3) in accordance with the relative orientations set forth in Table I. The operation of relay 8RC is determined by the circuitry of FIG. 8 in which figure, the winding of the relay is depicted.

Figure 6:
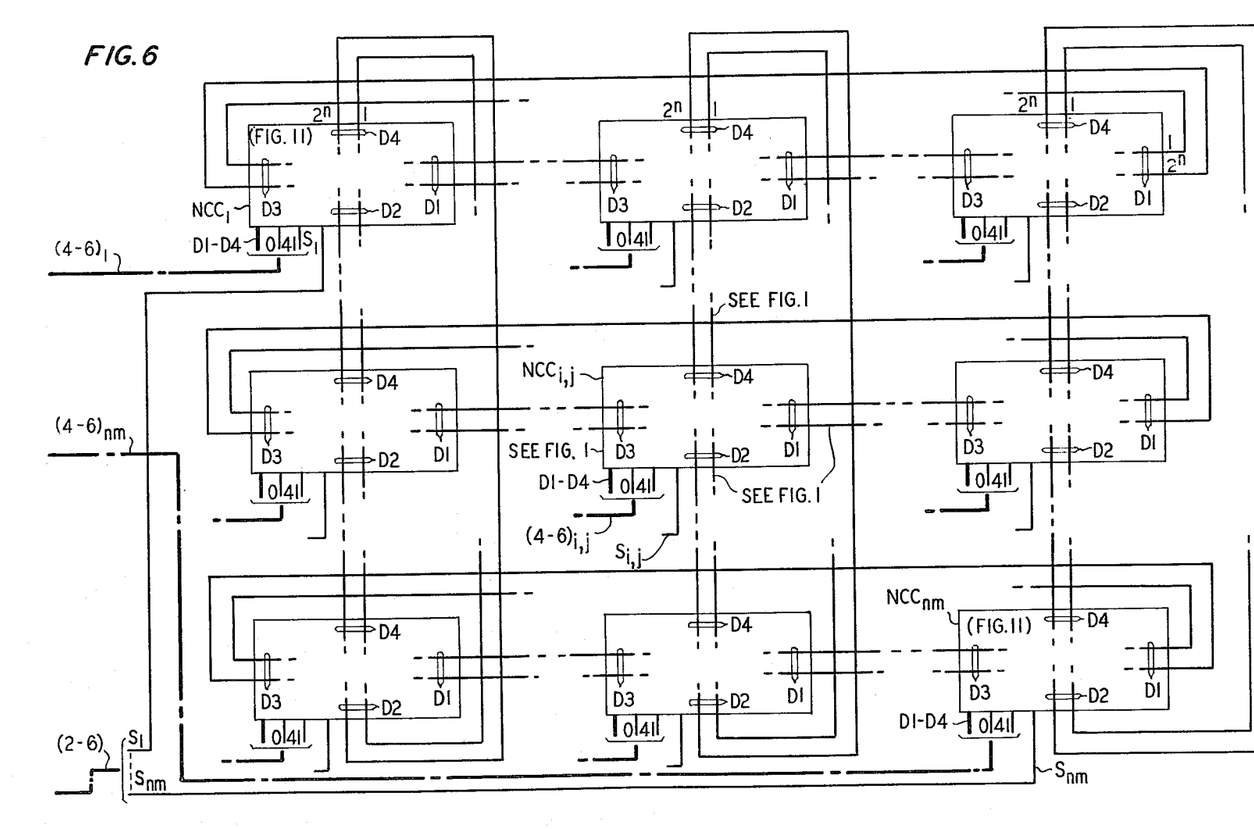
FIG. 6 shows, in abbreviated form, switching nodes of the nodal network.

Signal distributor 201 accesses the sleeve lead $S_{i,j}$ of the calling node at the coordinates furnished to access circuits 201X and 201Y and applies to the accessed sleeve lead the ground made available over back contacts 8RT-1 and 8RCT-1, make contacts 20N-1, back contacts 8CA-2 and the "tree" selection contacts (not shown) of access circuit 201Y. Off-normal relay 20N operates from signals appearing on any of the leads entering access circuits 201X and 201Y. The accessed sleeve $S_{i,j}$ is one of sleeve leads $S_1$ through $S_{nm}$ of cable (2–6) of FIG. 2 which may be traced through the lower edge of FIG. 4 to the array of nodal crosspoint configurations $NCC_1$ through $NCC_{nm}$ of FIG. 6. The details of the circuitry associated with the sleeve lead $S_{i,j}$ of the illustrative calling one of the nodal crosspoint configurations are depicted in FIG. 11.

Figure 11:
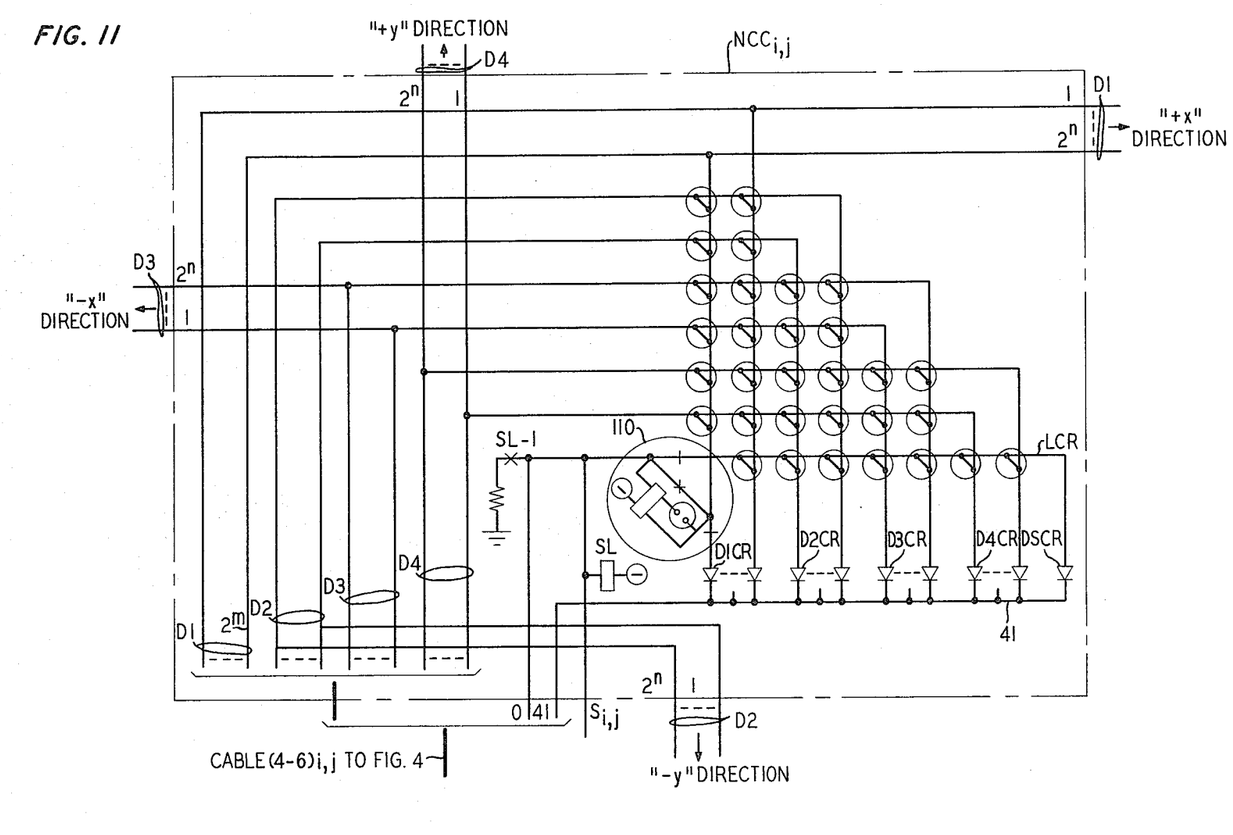
FIG. 11 shows the details of the sleeve lead connections of each of the switching nodes arranged in the network of FIG. 6.

The nodal crosspoint configuration $NCC_{i,j}$ of FIG. 11 is itself non-blocking since each link entering the node in any one of the directions defined by link group cables D1 through D4 may be connected to any other link in any of the three other link group cables or to the node termination (not shown). Only the leads 1 through $2^n$ of each link group cables D1 through D4 are shown in FIG. 11, although it should be understood that tip, ring or other conductors may advantageously be included in the cables and, correspondingly, additional crosspoints should be provided in the nodal crosspoint configuration.

Initially, it will be assumed that the configuration of the calling and called nodes is such that it is the X- and Y-coordinates of the calling node that are delivered to access circuits 201X and 201Y by gate arrays 238 and 251 of FIG. 2. A ground path is provided over back contacts 8RT-1 and 8RCT-1, operated make contacts 20N-1 and back contacts 8CA-2 and through the relay tree structure (not shown) of access circuit 201Y to sleeve $S_{i,j}$ of the calling node's one of the sleeve leads $S_1$ through $S_{nm}$ selected by the operation of access circuits 201X and 201Y. The selected sleeve lead is carried by cable (2–6) to a corresponding one ($NCC_{i,j}$) of the nodal crosspoint configurations $NCC_1$ through $NCC_{nm}$ of FIG. 6.

Let it be assumed that the calling node is at coordinates i,j. Ground will be extended to the sleeve lead $S_{i,j}$ of node $NCC_{i,j}$, FIG. 6, and, referring to FIG. 11 which shows a typical NCC, ground on sleeve lead S will operate relay SL. Relay SL operates and locks to resistance ground over its make contact SL-1. The resistance ground is continued over the back contacts of the lowest row of crosspoints and is applied through diode DSCR to lead 41. Lead 41 (see FIG. 4) is connected to the right-hand winding of a corresponding one of relays $41_1$ through $41_{nm}$ operating the appropriate "41" relay to the battery provided over the back contact of transfer contacts 41A-1. The particular operated "41" relay locks over its make contact 41-1 in series with back contact 4ADV-2, and the winding of slow release relay 41A which, in operating, opens the operating path to the right-hand winding of all the "41" relays. The operation of a "41" relay in FIG. 4 connects the test leads of the one of cables $(4–6)_1$ through $(4–6)_{nm}$ corresponding to the contacts of relays dD1 through dD4 along the lower edge of FIG. 4.

The operation of relay 41A at its make contact 41A-2 (shown in FIG. 8) completes an operating path to relay 8CA which locks over its make contact 8CA-1. Relay 8CA, in operating at its operated break contact 8CA-2 in FIG. 2, removes the sleeve lead ground from access circuit 201Y leaving only the resistance ground provided by contact SL-1 (FIG. 11) to remain on the sleeve lead of the calling node.

It was mentioned above with respect to FIGS. 2 and 3 that difference circuits 33Y and 33X energized one of gates 231 through 234 in accordance with the relative orientation of the calling and called nodes. The energized gates, in turn, energized one of leads $\theta_1$ through $\theta_4$ of cable (3–8).

Figure 8:
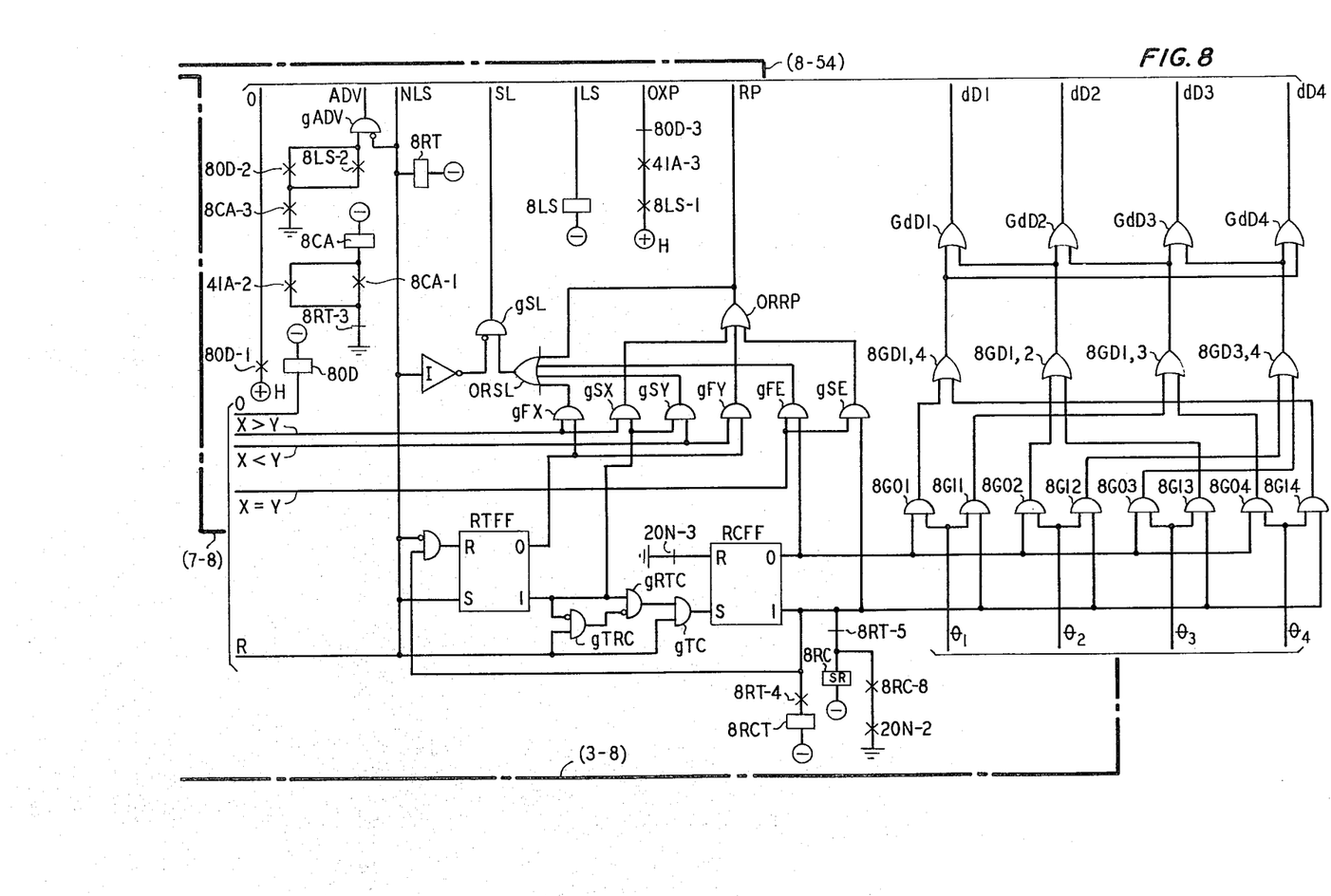
FIG. 8 shows the circuit for sequencing the operations of the circuitry of FIGS. 4 and 5.

In FIG. 8, the energized one of leads $\theta_1$ through $\theta_4$ energizes one lead of each of gate pairs 8G01 and 8G11; 8G02 and 8G12; 8G03 and 8G13; and 8G04 and 8G14. Assuming that this is a first trial attempt to extend the connection from the calling node, the left-hand one of the gate pairs will be energized from the zero output of flip-flop RCFF. Thus, if the relative orientation of calling and called nodes caused difference circuits 33X and 33Y to energize lead $\theta_1$, gate 8G01 would be enabled and would energize lead dD1 of cable (8-54) to FIG. 4.

Figure 4:
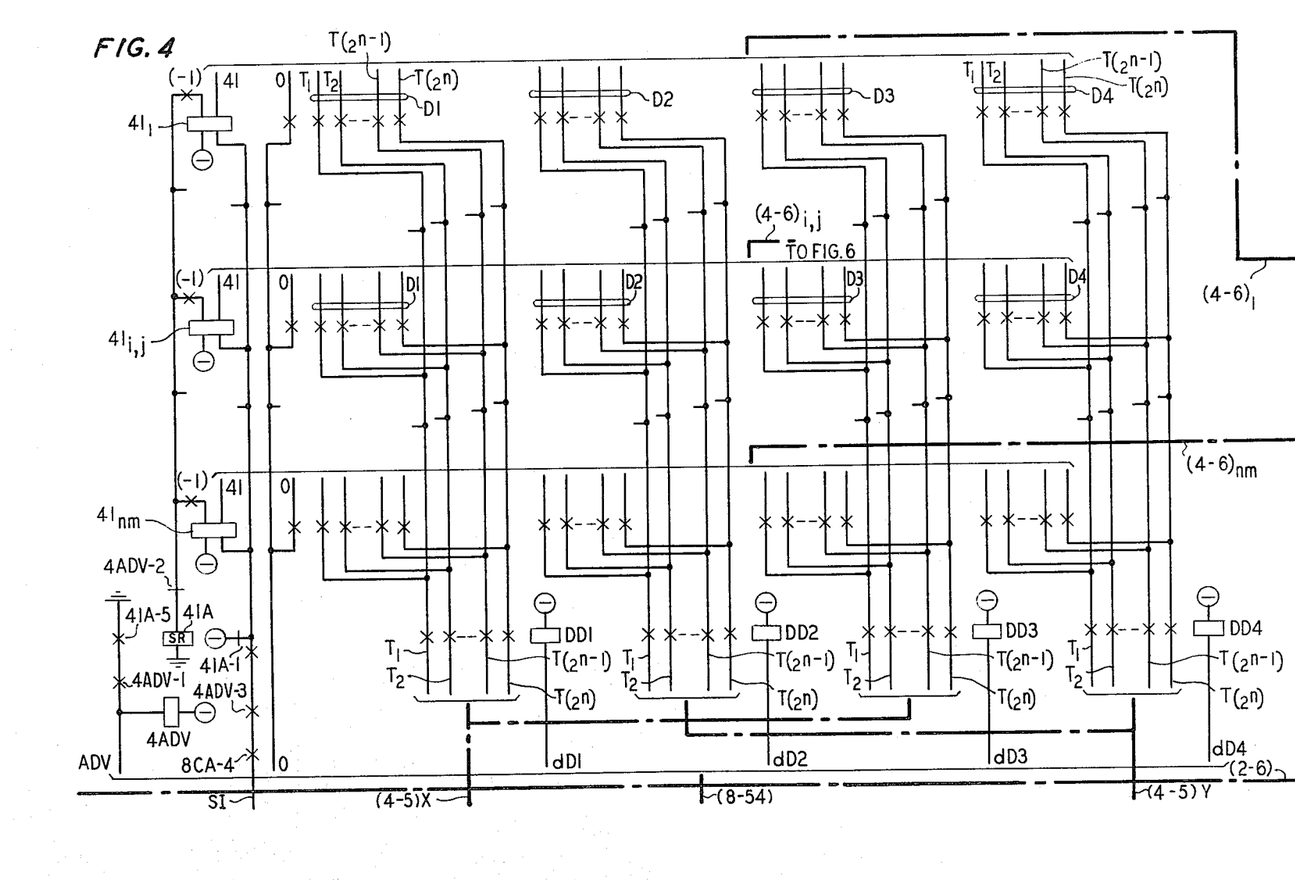
FIG. 4 shows the circuit for accessing the different order linkages available at a selected node.
Figure 5:
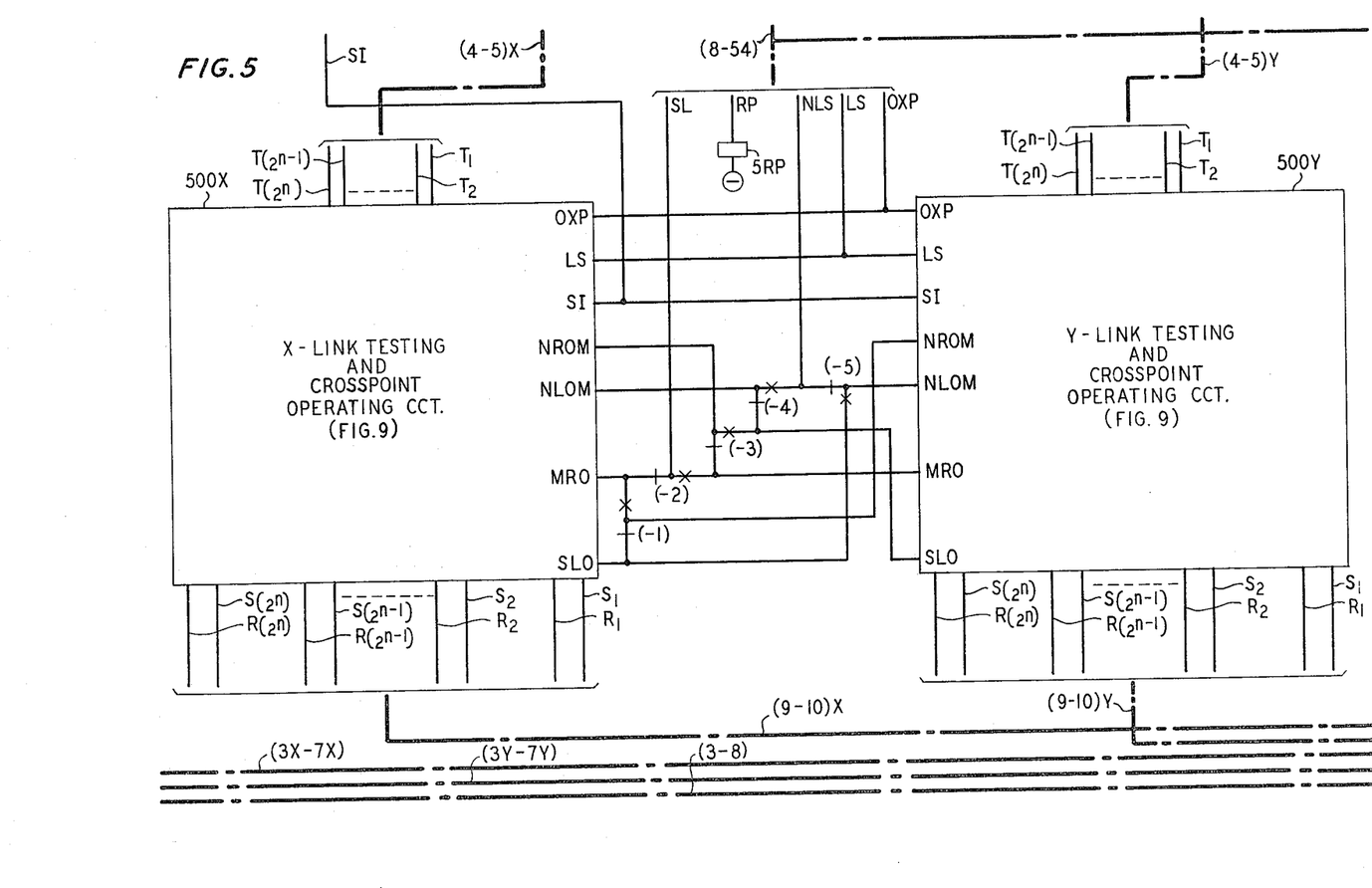
FIG. 5 shows the relationship of the X-coordinate and Y-coordinate link testing and crosspoint operating circuits shown in detail in FIG. 9.
Figure 9:
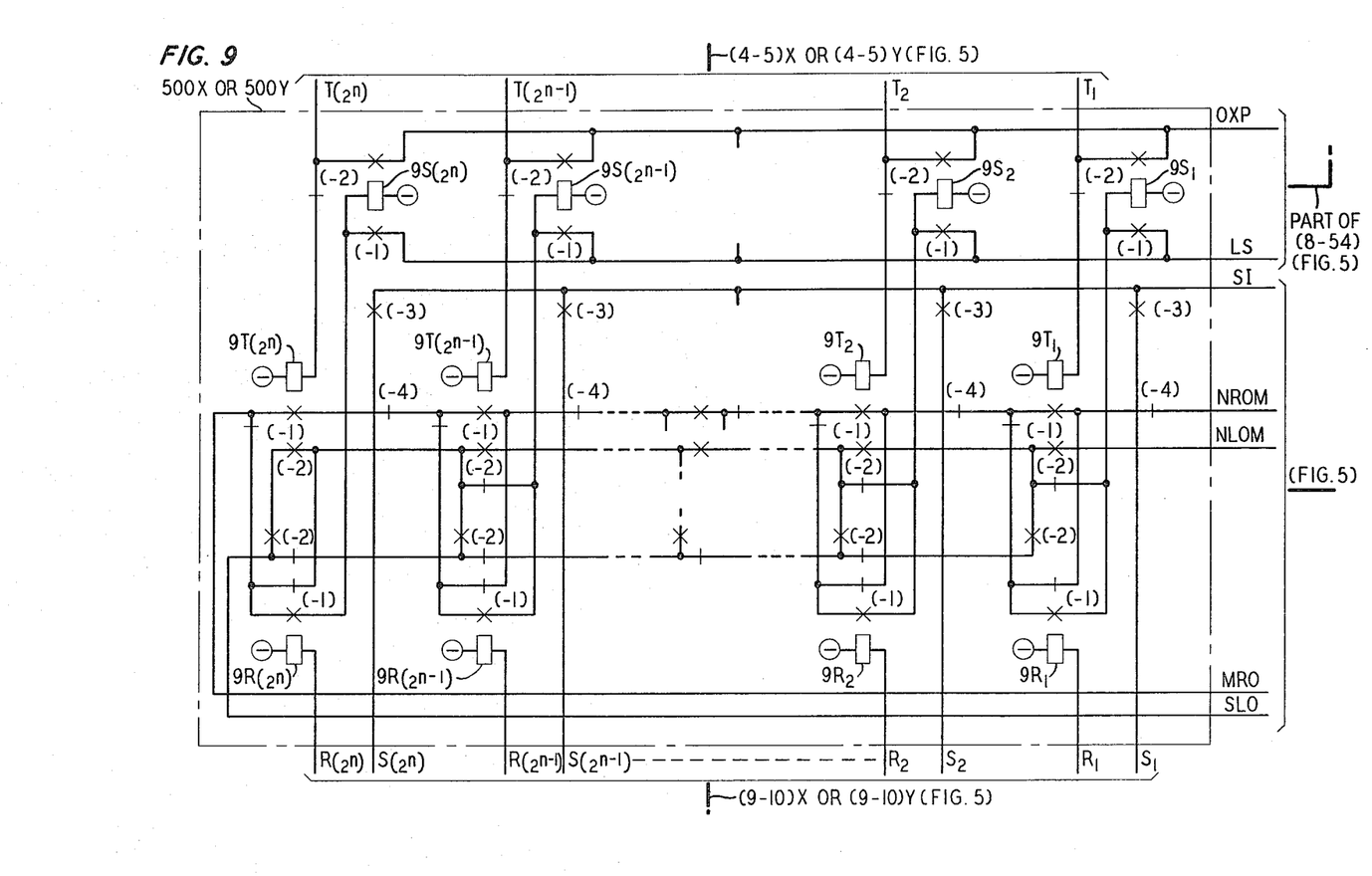
FIG. 9 shows the circuitry for testing and seizing a required order link, if available, and for testing and seizing a lower order link, if the required order link is not available.

Energized lead dD1 in FIG. 4 operates relay DD1, cutting through leads $T_1$ through $T_{(2n)}$ to the X-link testing and crosspoint operating circuit 500X of FIG. 5. The construction of the X-link and Y-link testing and crosspoint operating circuits 500X and 500Y of FIG. 9 is the same, and is shown in detail in FIG. 9.

It will be recalled that each nodal crosspoint configuration contains links to reach increasingly remote nodes in each of the four coordinate directions. Thus, lead $T_1$ is associated with a neighbor node one binary order removed; lead $T_2$ is associated with a node two binary orders removed, and so on; lead $T_{(2n)}$ being associated with a distant node n binary orders removed. Any of these links that are busy will cause their corresponding one of the relays $9T_{(2n)}$ through $9T_1$ to be operated in FIG. 9.

Figure 10:
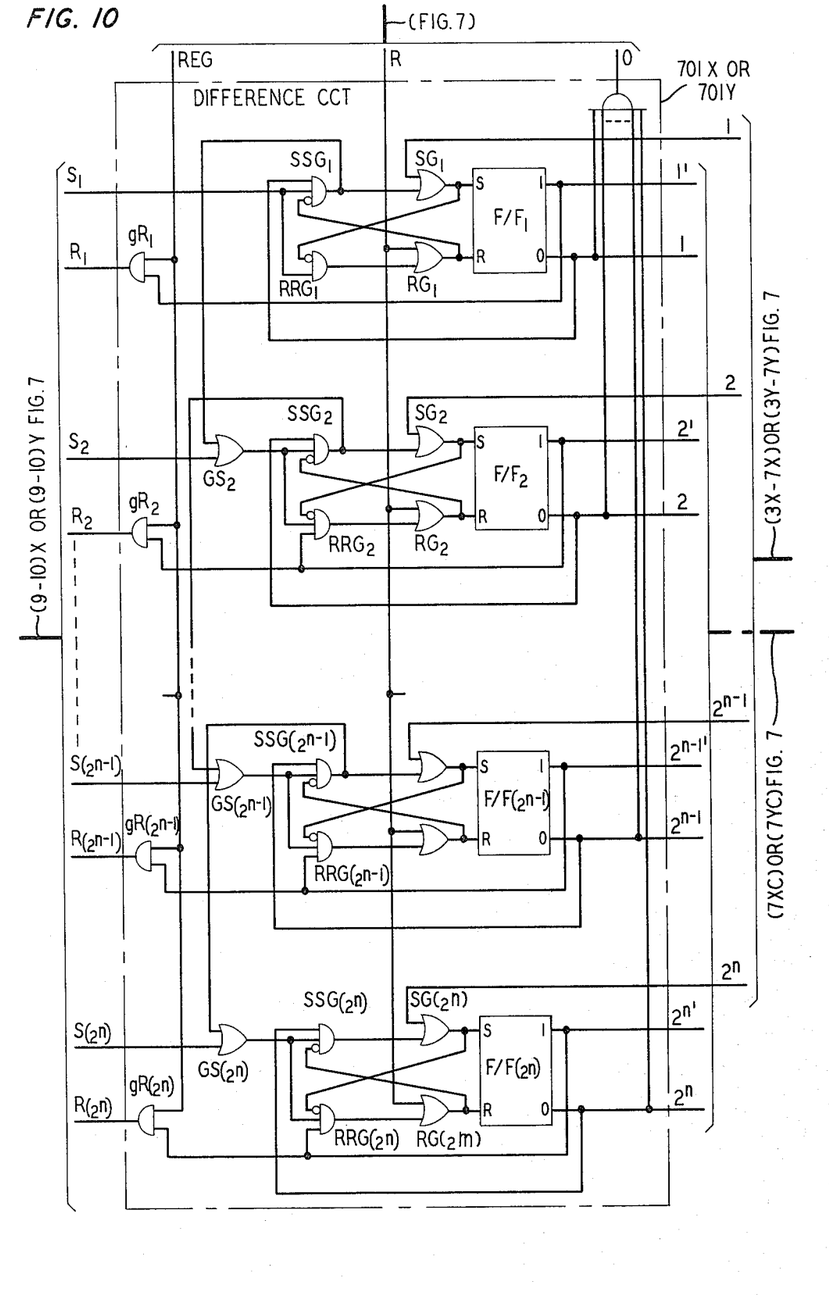
FIG. 10 shows the circuit for registering the designations of required orders of links and for updating the designations when required order linkages are busy.

Referring again to FIG. 2, it will be recalled that subtractors 21X and 21Y apply to the leads of cables (I-G) and (J-H), respectively, a pattern of binary energizations indicating the difference in the X- and Y-coordinates of the calling and called nodes. The difference in the Y-coordinates carried by cable (J-H) is applied in FIG. 3 through gates 242 to cable (3Y-7Y) and thence to the Y difference circuit 701Y of FIG. 7. Similarly, the difference in the X-coordinates carried by cable (I-G) is applied in FIG. 3 through gates 246 to cable (3X-7X) and thence to the X difference circuit 701X of FIG. 7. X difference circuit 701X and Y difference circuit 701Y are identical, and the details thereof are shown in FIG. 10. The binary pattern of energization of the leads of cables (3X-7X) or (3Y-7Y) sets corresponding ones of flip-flops $F/F_{(2n)}$ through $F/F_1$ via corresponding ones of OR gates $SG_{(2n)}$ through $SG_1$, respectively. The set ones of flip-flops $F/F_{(2n)}$ through $F/F_1$ operate respective ones of the required order relays $9R_{(2n)}$ through $9R_1$ of FIG. 9 over a path which may be traced from the "1" output of a set flip-flop through a respective one of gates $gR_{(2n)}$ through $gR_1$ at the left-hand side of FIG. 10 to cable (9-10)X or (9-10)Y to the winding of the respective required order relay in FIG. 9. Gates $gR_{(2n)}$ through $gR_1$ associated with lead REG are all simultaneously enabled by the operation of make contact 41A-4 in the REG lead at the upper right-hand portion of FIG. 7.

For example, if the difference in the X-coordinates between the calling and called nodes in the nodal switching network as delivered to circuit 701X by cable (3X-7X) is the binary number 1001, (9) in the decimal system, and if FIG. 10 is assumed to serve a nodal network having four binary orders, (FIG. 1, it will be recalled, depicted only three binary orders) then the four flip-flops shown in FIG. 10 may be taken as representing binary orders $n=2^3$ through $n=2^0$, where $2^3$ is the fourth binary order represented by the lowermost flip-flop $F/F_{(2n=3)}$. With this assumption carried throughout FIG. 9, relays $9R_{(2n=3)}$ and $9R_1$ will be operated and relays $9R_{(2n-1)}$ and $9R_2$ will remain released. With relay $9R_{(2n=3)}$ operated (and relay $9T_{(2n)}$ released indicating the link is idle) a path is provided from lead MRO over the make contact of its (−1) transfer contacts to operate relay $9S_{(2n=3)}$ to select a link of binary length $n=3$. Relay $9S_{(2n=3)}$ is operated to seize the link and to prevent, at its operated (−4) break contact, the seizure of any other link. The operation of relay $9S_{(2n=3)}$ at its (−1) make contact grounds lead LS of cable (8-54) and at its (−2) make contact connects lead OXP of cable (8-54) to lead $T_{(2n)}$.

Referring to FIG. 8, ground on lead LS of cable (8-54) operates relay 8LS which, at its operated make contacts 8LS-1, extends heavy positive battery +H over previously operated make contacts 41A-3 and released break contacts 8OD-3 to lead OXP of cable (8-54). The operation of relay 8LS at its make contacts 8LS-2 enables gate gADV over a path provided from ground by the prior operation of contact 8CA-3. The enabling of gate gADV applies ground to lead ADV of cable (8-54) and the ground on lead ADV in FIG. 4 operates relay 4ADV. Relay 4ADV, in operating, at its operated make contact 4ADV-1 locks to the ground temporarily provided over still-operated make contact 41A-5 and at its operated break contact 4ADV-2 opens the operating and holding path for relay 41A. Relay 41A is a slow release relay to permit a number of operations to take place as will hereinafter be described.

The heavy positive potential applied to lead OXP by the operation of contact 8LS-1 of FIG. 8 is forwarded in FIG. 9 over the path made available by the operated (−2) contacts of relay $9S_{(2n=3)}$ to lead $T_{(2n=3)}$. As indicated in FIG. 9, lead $T_{(2n)}$ is a lead of cable (4-5)X in the case of X-link testing and crosspoint operating circuit 500X or of cable (4-5)Y in the case of Y-link testing and crosspoint operating circuit 500Y (see FIG. 5). Recalling the assumed circumstances, the continuity of lead $T_{(2n=3)}$ of circuit 500X is continued over cable (4-5)X to FIG. 4 and the operated make contacts of relays DD1 and $41_{i,j}$ to lead $2^n$ of the D1 conductor bundle of cable $(4-6)_{i,j}$ and thereby to $NCC_{i,j}$ of FIG. 6. Additional details of the crosspoint circuitry of $NCC_{i,j}$ are shown in FIG. 11, attention to which is now invited.

It will be recalled that, in FIG. 11, it was previously assumed that sleeve relay SL of the calling node had been operated and locked to apply ground over its make contact SL-1 to the lowermost horizontal conductor row. The heavy positive potential appearing on lead $2^n$ of conductor bundle D1 of cable $(4-6)_{i,j}$ in combination with the ground on the lowermost conductor row LCR of FIG. 11 causes the gas tube of crosspoint 110 of the calling node to fire, operating the crosspoint relay therein to connect the sleeve lead S of the calling node termination to conductor $2^n$ of conductor bundle D1 to extend a connection in the "+X" direction from the calling node toward the next node. In the next node, this ground is incoming on lead $2^n$ of its conductor bundle D3. This ground finds its way over back contacts of unoperated crosspoints and one of the diodes therein to the new node's "41" lead.

As in the case of the calling node $NCC_{i,j}$, the new node has its "41" lead connected to a particular one of relays $41_1$ through $41_{nm}$ in FIG. 4. The "41" relay for the new node cannot, however, be operated by the ground appearing on the new node's "41" lead until relay 41A releases from the operated state in which it was placed incident to the seizure of the calling node. Prior to the release of relay 41A therefore a temporary path is provided from ground on the "41" lead of the new node through the still-operated contacts 41A-1 and make contacts 4ADV-3, 8CA-4 to lead SI and the operated (−3) make contact of relay $9S_{(2n=3)}$ (see FIG. 9) and lead $S_{(2n)}$ to FIG. 10, wherein the ground resets required order flip-flop $F/F_{(2n=3)}$. Flip-flop $F/F_1$ remains set however. (Relay $41_{i,j}$ does not operate in this high impedance circuit.) The set state of flip-flop $F/F_1$ indicates that an additional link of length $n=1$ is still required to further extend the connection from the new node to the next node in the X direction. This selection process will occur (once relay 41A finally releases) in similar fashion to that described above for the selection of link $n=3$ to the first new node.

At the same time that relay 4ADV was operated in FIG. 4 by the enabling of control gate gAVD in FIG. 8, relay $41_{i,j}$ of the calling node was released. The release of relay $41_{i,j}$ disconnects cables (4–5)X and (4–5)Y from the calling node $NCC_{i,j}$ causing the release of relays $9T_{(2n=3)}$ and $9S_{(2n)}$ in FIG. 9. The release of relay $9S_{(2n)}$ at its released make contact (−1) removes the enabling ground from lead LS, releasing relay 8LS in FIG. 8. Release of relay 8LS at its released make contact 8LS-1 removes heavy positive potential from lead OXP. After the release of relay 41A, the restoring of the back contact of its transfer contacts 41A-1 reapplies battery to the right-hand windings of all of relays $41_1$ through $41_{nm}$ of FIG. 4, permitting the "41" relay of the new node to be operated by the ground appearing on the new node's 41 lead. With the operation of the "41" relay of the new node, the crosspoint selection and operating cycle is repeated with the new binary difference remaining in difference circuit 701X. It will be recalled that this difference is indicated by flip-flop $F/F_1$ remaining set.

If, in the above description of the operation of FIGS. 9 and 10 incident to the selection of a link from the calling node $NCC_{i,j}$ to the new node, link $n=3$ was found to be busy, as indicated by the operation of relay $9T_{(2n=3)}$, the continuity of lead MRO will be transferred via the make contact of the (−1) transfer contacts of relay $9T_{(2n=3)}$ to the (−1) transfer contacts of the next lower binary order relay $9T_{(2n-1)}$. In the illustrative example, relay $9R_{(2n-1)}$ was assumed to have remained in the released condition, and, consequently, the extension of the continuity of lead MRO as just described cannot, at this time, result in the operation of relay $9S_{(2n-1)}$. Similarly, with relay $9R_2$ remaining released the contacts of relay $9T_2$ are bypassed in the same fashion and for the same reason as the contacts of relay $9T_{(2n-1)}$ were effectively bypassed.

If none of the required order relays $9S_{(2n)}$ through $9S_1$ can be operated in FIG. 9 because certain of the required binary order links are not required or those that are required are busy, the continuity of lead MRO will be continued to lead NROM. Referring to FIG. 5, let it be assumed that ground so appears on lead NROM of the X-link test and crosspoint operated circuit 500X. Relay 5RP will normally be in the released condition and the ground on lead NROM will be continued over the back contacts of the (−3) transfer contacts of this relay to lead MRO of the Y-link testing and crosspoint operating circuit 500Y. Circuit 500Y operates in response to the grounding of its lead MRO in precisely the manner described for FIG. 9, except that the relays $9R_{(2n)}$ through $9R_1$ of circuit 500Y will have been set by a binary pattern of energization of cable (3Y-7Y) (and the corresponding flip-flops $F/F_{(2n)}$ through $F/F_1$ of FIG. 10), usually in a different pattern than that in which the corresponding flip-flops were set by the leads of cable (3X-7X).

If all of the required binary order links tested by circuit 500Y are busy, ground will appear on lead NROM of circuit 500Y and will be continued to the (−1) transfer contacts of relay 5RP to lead SLO of circuit 500X. Referring again to FIG. 9, ground appearing on lead SLO will be applied to the (−2) transfer contacts of relay $9R_{(2n)}$. Under the circumstances being assumed, relay $9R_{(2n=3)}$ was operated and relay $9T_{(2n=3)}$ operated indicating this required order was busy. Accordingly, the continuity of lead SLO will be extended to the (−2) transfer contacts of relay $9T_{(2n-1)}$. If relay $9T_{(2n-1)}$ is unoperated because the associated binary order link is idle, continuity of lead SLO will be extended over the back contact of the (−2) transfer contacts of this relay to operate relay $9S_{(2n-1)}$ thereby selecting the link that is one order lower than the required order ($n=3$) indicated by the set flip-flop of FIG. 10.

If the first lower order binary link were also busy, the continuity of lead SLO would be extended over the make contact of the (−2) transfer contacts of relay $9T_{(2n-1)}$ to the (−2) transfer contacts of the next lower ordered "T" relay of FIG. 9 to operate the first available one of the "S" relays therein.

If, however, all of the "9T" relays of FIG. 9 are busy, the continuity of lead SLO will be extended until ground appears on lead NLOM of circuit 500X. Ground on lead NLOM of circuit 500X is extended in FIG. 5 over the back contact of the (−4) transfer contacts of relay 5RP to lead SLO of circuit 500Y. Circuit 500Y operates in similar fashion to that just described with respect to circuit 500X to seize the corresponding one of the "9S" relays therein. If, however, no "9S" relay can be operated in circuit 500Y, ground will appear on lead NLOM which will be extended over the back contact of the (−5) transfer contacts of relay 5RP to lead NLS of cable (8-54). Ground on lead NLS in FIG. 8 causes relay 8RT to operate and sets flip-flop RTFF.

It should be noted that there is a slight difference in the operation of FIG. 10 when a "9S" relay of FIG. 9 is operated as the result of the extension to it of a ground operating path from lead MRO than when a "9S" relay is operated by the extension to it of ground from lead SLO. Under the latter circumstances, the "9S" relay operated will be that of a "lower" binary order than that dictated by an operated one of the required order flip-flops $F/F_{(2n)}$ through $F/F_1$. Assuming that relay $9R_{(2n=3)}$ was an operated required order relay, relay $9R_{(2n=2)}$ was a non-operated relay in FIG. 9, and that the extension of continuity of lead SLO resulted in the operation of relay $9S_{(2n=2)}$, ground will appear on lead $S_{(2n-1)}$ of FIG. 10 and be applied through OR gate $GS_{(2n-1)}$ to control gate $SSG_{(2n-1)}$. Since flip-flop $F/F_{(2n-1)}$ is assumed to be in the reset state, gate $SSG_{(2n-1)}$ will be enabled to set flip-flop $F/F_{(2n-1)}$. At the same time, the enabled gate $SSG_{(2n-1)}$ will apply a signal through OR gate $GS_{(2n)}$ to reset the higher order required order flip-flop $F/F_{(2n)}$ which had priorly been set over cable (3X-7X) or (3Y-7Y) to designate an originally required order.

In the link selection process, preference is given on two bases: First, the links which define the shortest total path length in each coordinate direction are tested. Such links are those that, by themselves, span the greatest part of the direct path length and are therefore the longer links in the direct path. Longer ones are preferred because shorter lengths, if needed at all, will be chosen as the connection progresses toward reaching the desired termination. The second preference relates to the selection of either the X-coordinate or Y-coordinate direction to the next node, assuming that the difference between the calling and called nodes is not zero in either of these directions. The difference circuit 701X not only indicates the binary difference between the X-coordinates of the node to which the connection has progressed and the terminating node to which the connection must ultimately extend, but also the number of unique binary length links required to finish the connection path in the X-coordinate direction. The same, of course, is true for Y difference circuit 701Y. If X, the number of links in the X-coordinate direction, equals Y, the number of links in the Y-coordinate direction, the preference depends on whether this is a first or second trial. On a first trial, the X-coordinate direction is preferred, and, on a second trial, the Y-coordinate is preferred. The X- or Y-coordinate preference in this regard is controlled by the state of relay 5RP whose contacts (−2) determine whether the SL lead ground from cable (8–54) of FIG. 8 should first be extended to the MRO lead of circuit 500X or of 500Y, and another of whose contacts determine the routing of any ground appearing on lead NROM of that unit to the MRO lead of the other as previously described.

The state of relay 5RP is determined by the circuitry of FIG. 8 as conditioned by the state of the leads of cable (7–8). It will be recalled that the flip-flops $F/F_{(2n)}$ through $F/F_1$ of the X difference circuit 701X and of Y difference circuit 701Y were initially set according to the X-coordinate and Y-coordinate differences between the calling and called nodes. The set state of these flip-flops is conveyed over cables (7XC) and (7YC), respectively, to the array of gates in the central part of FIG. 7. This central gate array energizes one of leads X<Y, X=Y or X>Y of cable (7–8). If the difference in X-coordinate is zero, circuit 701X energizes its zero output lead O and, if the Y-coordinate difference is zero, circuit 701Y energizes its zero output lead O. If both zero output leads are energized, gate gOO energizes the zero lead O of cable (7–8).

Figure 7:
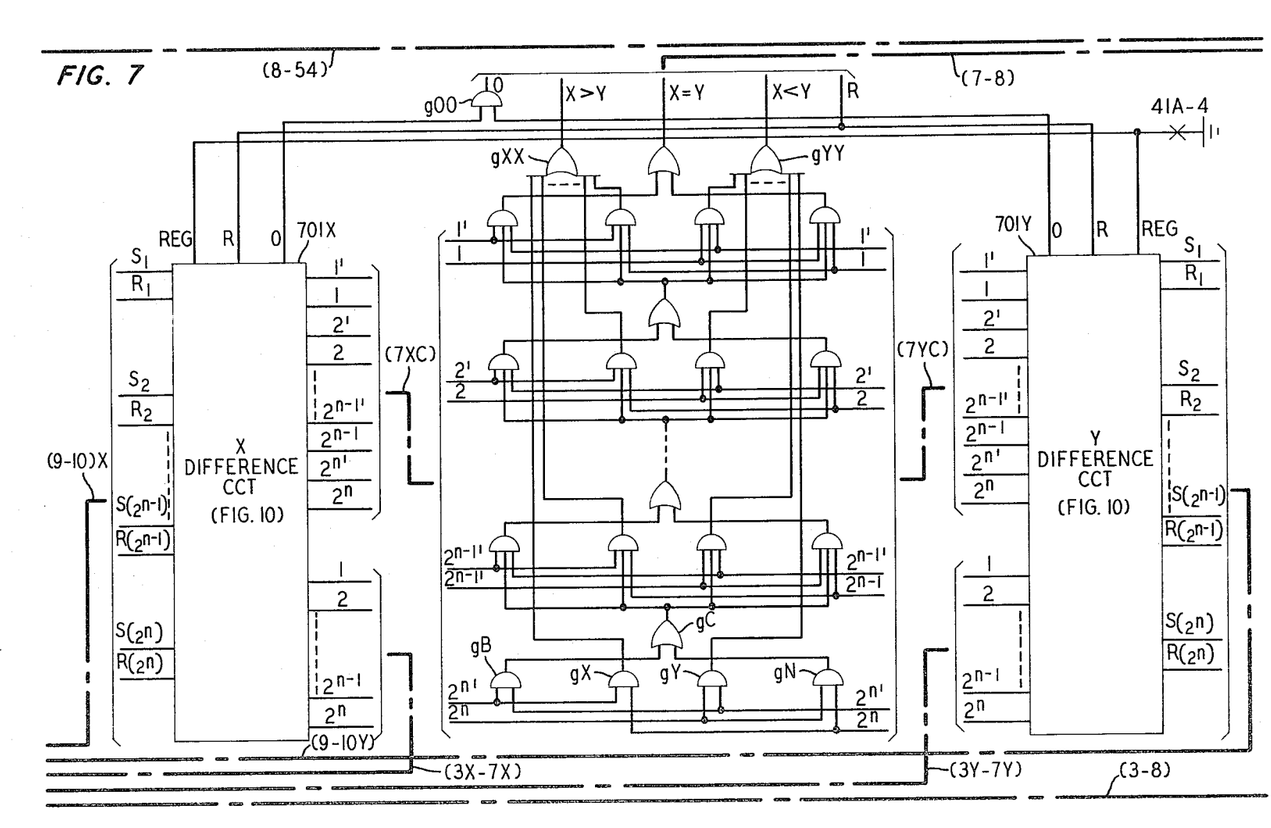
FIG. 7 shows the arrangement of the X-coordinate and Y-coordinate difference circuits that are detailed in FIG. 10.

The operation of the gates of the central array of FIG. 7 may be most easily understood by referring to the lowermost row of AND gates. These gates are associated with the outputs of the highest required order flip-flops of circuits 701X and 701Y and compare whether the X difference circuit 701X or the Y difference circuit 701Y has its highest required order flip-flop $F/F_{(2n)}$ set. If neither circuit 701X or 701Y has its highest order flip-flop set, AND gate gN is enabled while, if both have their highest required order flip-flop set, gate gB is set. In either case, the result is indeterminate insofar as deciding which coordinate direction requires the longest required order link and so OR gate gC is enabled to pass the determination on to the next row of gates according to the stages of the next-to-highest required order flip-flops of circuits 701X and 701Y. If, however, the highest required order flip-flop of circuit 701X is set and that of circuit 701Y is not set, gate gX will be enabled enabling one input of OR gate gXX. Likewise, if the highest required order flip-flop of circuit 701Y is set, and that of circuit 701X is not set, gate gY will be enabled to enable one input of OR gate gYY. In similar fashion, the central gate array of FIG. 7 compares the set states of the other required order flip-flops of circuits 701X and 701Y to establish the pattern of energization of the leads of cable (7–8) until a mismatched order is encountered (X>Y or X<Y) or all orders are alike (X=Y).

If "OR" gate gYY, at the upper edge of the central gate array, is enabled, lead X<Y of cable (7–8) is enabled, whereas, if gate gXX is enabled, lead X>Y of cable (7–8) is enabled.

In FIG. 8, leads X>Y and X<Y determine the states of gates gFY, gSY, gFX, and gSX in cooperation with the state of flip-flop RTFF. The state of lead X=Y determines the state of gates gFE and gSE according to the state of flip-flop RCFF. If lead X>Y is energized and this is a first trial attempt, gate gFX will be energized to apply a ground through OR gate ORSL and control gate gSL to lead SL of cable (8–54), but lead RP will not be grounded and relay 5RP in FIG. 5 will remain normal, thereby according SL lead preference to the MRO lead of circuit 500X. On the other hand, if lead X<Y is energized on a first trial, gate gFY will be enabled to apply the ground through gate ORRP to lead RP of cable (8–54) thereby operating relay 5RP in FIG. 5 and according preference to circuit 500Y. If lead X=Y is energized, gate gFE will be enabled on a first trial to apply a ground only to lead SL, while on a second trial, gate gSE will be enabled by the set state of flip-flop RCFF to apply ground to leads RP and SL via OR gate ORRP.

If both circuits 701X and 701Y determine that no further links are required in each of the X- and Y-coordinate directions, AND gate gOO is enabled to ground lead O of cable (7–8), thereby operating relay 80D in FIG. 8. Operation of relay 80D at its make contact 80D-1 applies heavy positive potential to lead O of cable (8–54) to operate the last crosspoint necessary to complete the extension of the connection to the called node. At operated make contact 80D-2, ground is applied through gate gADV to lead ADV of cable (8–54) to operate relay 4ADV in FIG. 4 and open the path through back contact 4ADV-2 to initiate the release of relay 41A. With the connection finally advanced from one node to the other and completed, ground is applied to the RLS lead in FIG. 2 over make contacts 4ADV-5, 80D-5 and 20N-5 to the call information processing circuit (not shown) which provided the input information to input register 200. This allows the call information process circuits to release input registers 200 and restore the circuit to normal for operation on another call.

The application of a ground to lead SL of cable (8–54) by the circuitry of FIG. 8 is required so that the MRO lead of either circuit 500X or 500Y (as determined by the state of relay 5RP) will receive a ground to enable one of these circuits to operate the "9S" relay in FIG. 9 of an idle link of required order length or of lower order. If neither circuit 500X nor 500Y is able to select an idle link, a ground will eventually be applied by one of circuits 500X or 500Y to lead NLS of cable (8–54). The appearance of ground on lead NLS in FIG. 8 operates relay 8RT, sets flip-flop RTFF and grounds lead R of cable (7–8) to reset all of the flip-flops of FIG. 10. The operation of relay 8RT at its (−1) break contact in FIG. 2 removes ground from the Y access circuit 201Y of signal distributor 201 and, at its operated (−2) make contact applies battery to access circuit 201Y. In FIG. 8, the operated (−3) break contact of relay 8RT opens the locking path for relay 8CA which relay was operated by the (−2) contact of relay 41A of FIG. 4 incident to the seizure of the leads to the calling node.

The application of battery to the sleeve lead "S" forces the release of the SL relay of the calling node and the release of any and all crosspoints that had been operated in extending the connection from the calling toward the called node. The same ground that appeared on lead NLS to operate relay 8RT also is applied through an inverter to the inhibit terminal of gate gSL temporarily blocking the gate from transmitting any ground to lead SL of cable (8-54). Removal of ground from lead SL results in the removal of ground from lead NLS releasing relay 8RT. The release of relay 8RT at its restored back contacts 8RT-1 in FIG. 2 reapplies enabling ground through Y access circuit 201Y of signal distributor 201 to the sleeve lead "S" of the calling node once again to operate the calling node's SL relay. The sequence of operations previously described, beginning with the initial operation of the calling node's SL relay, is repeated with the difference that flip-flop RTFF, being in the set condition, alters the preference among gates gFX, gSX, gSY and gFY and, consequently, the state of relay 5RP in FIG. 5. Circuits 500X and 500Y will again attempt their sequential procedure to select an idle link toward the called node, but in opposite coordinate because of the changed state of relay 5RP.

If the sequence of attempts is still unsuccessful in seizing a "9S" relay in FIG. 9, lead NLS will again be grounded operating relay 8RT, FIG. 8, for the second time. This time, the set state of flip-flop RTFF and the ground on lead NLS will enable gate gTC to set flip-flop RCFF. Flip-flop RCFF, in the set state, will operate relay 8RCT over the path prepared by the operation of the (−4) make contact of relay 8RT. Relay 8RCT is slow to release and will hold up briefly after relay 8RT is again released by the blocking of ground from leads SL and NLS. Once again, in FIG. 2, the operation of relay contacts (−1) and (−2) of relay 8RT forces the release of the SL relay of the calling node and the release of all crosspoints along the extended connection from the calling node toward the called node. When relay 8RT releases due to the disappearance of ground from lead NLS, relay 8RC operates over the path completed to the set "1" output of flip-flop RCFF over restored back contacts 8RT-5. Relay 8RC operated locks over its make contact 8RC-8 to the ground provided over make contact 2ON-2. The release of relay 8RT at its restored (−1) break contacts in FIG. 2 does not, however, restore enabling ground to the Y access circuit since slow release relay 8RCT maintains its break contact 8RCT-1 in FIG. 2 operated for a short interval following the release of relay 8RT. The operation of relay 8RC at its transfer contacts 8RC-1,Y through 8RC-m,Y in FIG. 2 changes the information fed to Y access circuit 201Y and at its tranfer contacts 8RC-1,X through 8RC-n,X changes the information applied to X access circuit 201X. Signal distributor 201 will now access the sleeve lead of the called node instead of the calling node and apply a ground to that sleeve lead "S" since relay 8RCT finally releases. A sequence of operations similar to those already described with respect to the calling node now ensue with respect to the called node in an attempt to establish a connection path from the called node toward the calling node. When the SL relay of the called node is now operated, the selection process is already started, but since flip-flop RCFF in FIG. 8 is in the set state, a different pair of leads dD1 through dD4 will be energized to operate a different set of relays DD1 through DD4 of FIG. 4.

Thus far, I have described a nodal switching network wherein each node is linked to a number of other nodes in a reentrant nodal switch "plane" by links ordered according to binary powers. In the above description, only the sleeve leads have been shown and relay technology has been employed for purposes of illustration. It will be apparent to those having experience in the telecommunications art that tip and ring conductors may also be provided or that delta coded modulation systems may be employed to carry speech conductors over the single path illustrated. Additionally, it will also be apparent that the relay logic may be replaced with integrated circuit logic and stored program control employed to operate the gates of such integrated circuit logic. Further and other modifications will also be apparent to those having skill in the art without, however, departing from the spirit and scope of my invention.

I claim:

1. A nodal switching system having a plurality of switching nodes interconnectable by a network of link groups having lengths ordered according to increasing powers of a finite integer base, comprising:
   means for registering the coordinate distances in said network between calling and called ones of said nodes;
   means controlled by said registering means for identifying a link spanning the most of the distance in each of a pair of coordinate directions between said calling and called ones of said nodes;
   means for testing and seizing an idle one of the said identified links in one of said coordinate directions; and
   means operative when there is no said idle one of said links for testing and seizing an idle link spanning the next longest distance in said one of said coordinate directions.

2. A nodal switching system according to claim 1 wherein said means controlled by said registering means further includes means for according a preference to one direction of said pair of coordinate directions and wherein said means operative when there is no idle link further includes means for controlling said testing and seizing means to test and seize an idle link in the other coordinate direction of said pair of coordinate directions.

3. A nodal switching system according to claim 2 wherein said means for controlling said testing and seizing means includes means for testing and seizing an idle link spanning the most of the distance in said other coordinate direction between said calling and called ones of said nodes.

4. A nodal switching network according to claim 1 wherein said link lengths are ranked according to increasing binary order, and wherein said means for registering includes means for indicating all of said binary link length orders required to continue a connection being established.

5. A nodal switching system according to claim 1 wherein said means controlled by said registering means includes means for first determining whether a connection is to be established from said calling node to said called node, or vice versa, and means for thereafter controlling said identifying means in accordance with the determination made by said determining means.

6. In a nodal switching system having a plurality of switching nodes interconnectable by coordinate link groups having links of lengths ordered according to increasing powers of a finite integer base, the improvement comprising:
   means for ascertaining the relative orientation of a called to a calling one of said nodes;

means for registering the coordinate distances between said calling and called ones of said nodes; and means controlled by said ascertaining means and said registering means for seizing a link group in one of said coordinate directions spanning the most of one of said coordinate distances.

7. In a nodal switching system according to claim 6 the improvement wherein said means for registering includes means for designating the required orders of link lengths in each of said coordinate directions between said calling and called ones of said nodes.

8. In a nodal switching system according to claim 7 the improvement wherein said controlled means includes means for first testing to seize one of said required orders of links in one said coordinate direction.

9. In a nodal switching system according to claim 8 the improvement wherein said controlled means includes means for subsequently testing to seize one of said required orders of links in another of said coordinate directions.

10. In a nodal switching system according to claim 9 the improvement wherein said controlled means includes means operative when no idle one of said required orders of links can be seized for testing to seize a link of less than required order in one of said coordinate directions.

11. In a nodal switching system according to claim 6 wherein said switching nodes are arranged on a reentrant plane and wherein said coordinate link groups each include at least one link interconnecting each of said nodes with a nearest adjacent one of said nodes and a plurality of further links connecting each of said nodes with a node distant $2^{n-1}$ nodes away where n includes integers from zero to (M/2) where M is the number of said switching nodes in one coordinate direction of said reentrant plane.

* * * * *